United States Patent
Fang et al.

(10) Patent No.: US 7,586,557 B2
(45) Date of Patent: Sep. 8, 2009

(54) BACKLIGHT MODULE WITH ILLUMINATOR HOLDING MEMBER HAVING BUFFERING PORTION AND LIQUID CRYSTAL DISPLAY WITH SAME

(75) Inventors: Chien-Chung Fang, Miao-Li (TW); Lin-Dong Fang, Shenzhen (CN)

(73) Assignees: Inncom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/985,086

(22) Filed: Nov. 13, 2007

(65) Prior Publication Data

US 2008/0111939 A1    May 15, 2008

(30) Foreign Application Priority Data

Nov. 10, 2006   (TW) ............... 95141772 A (51) Int. Cl.
G02F 1/1333    (2006.01)
(52) U.S. Cl. .......................................... 349/58; 349/60
(58) Field of Classification Search ................... 349/58, 349/60
See application file for complete search history.

(56) References Cited

U.S. PATENT DOCUMENTS

| 6,722,773 | B2 | 4/2004 | Tsai et al. | |
| 7,165,862 | B2 * | 1/2007 | Wu | 362/218 |
| 2007/0103854 | A1 * | 5/2007 | Yu et al. | 361/681 |

* cited by examiner

Primary Examiner—Frank G Font
Assistant Examiner—Eric Wong
(74) Attorney, Agent, or Firm—Wei Te Chung (57) ABSTRACT

An exemplary backlight module includes a light guide plate having a light incident surface, an illuminator adjacent to the light incident surface of the light guide plate, and an illuminator holding member coupled to one end of the illuminator. The illuminator holding member includes a first holding hole receiving the end of the illuminator such that the holding member holds the end of the illuminator, and a first buffering cavity between the first holding hole and the light incident surface of the light guide plate. A liquid crystal display including the backlight module is also provided.

18 Claims, 8 Drawing Sheets

BACKLIGHT MODULE WITH ILLUMINATOR HOLDING MEMBER HAVING BUFFERING PORTION AND LIQUID CRYSTAL DISPLAY WITH SAME

FIELD OF THE INVENTION

The present invention relates to a backlight module that includes an illuminator holding member having one or more buffering portions, and a liquid crystal display (LCD) including the backlight module.

BACKGROUND

Liquid crystal displays are commonly used as display devices for compact electronic apparatuses, because they not only provide good quality images but also they are very thin. Because liquid crystal in a liquid crystal display does not emit any light itself, the liquid crystal requires a light source to be able to clearly and sharply display text and images. Therefore, a typical liquid crystal display requires an accompanying backlight module.

Figure 11:
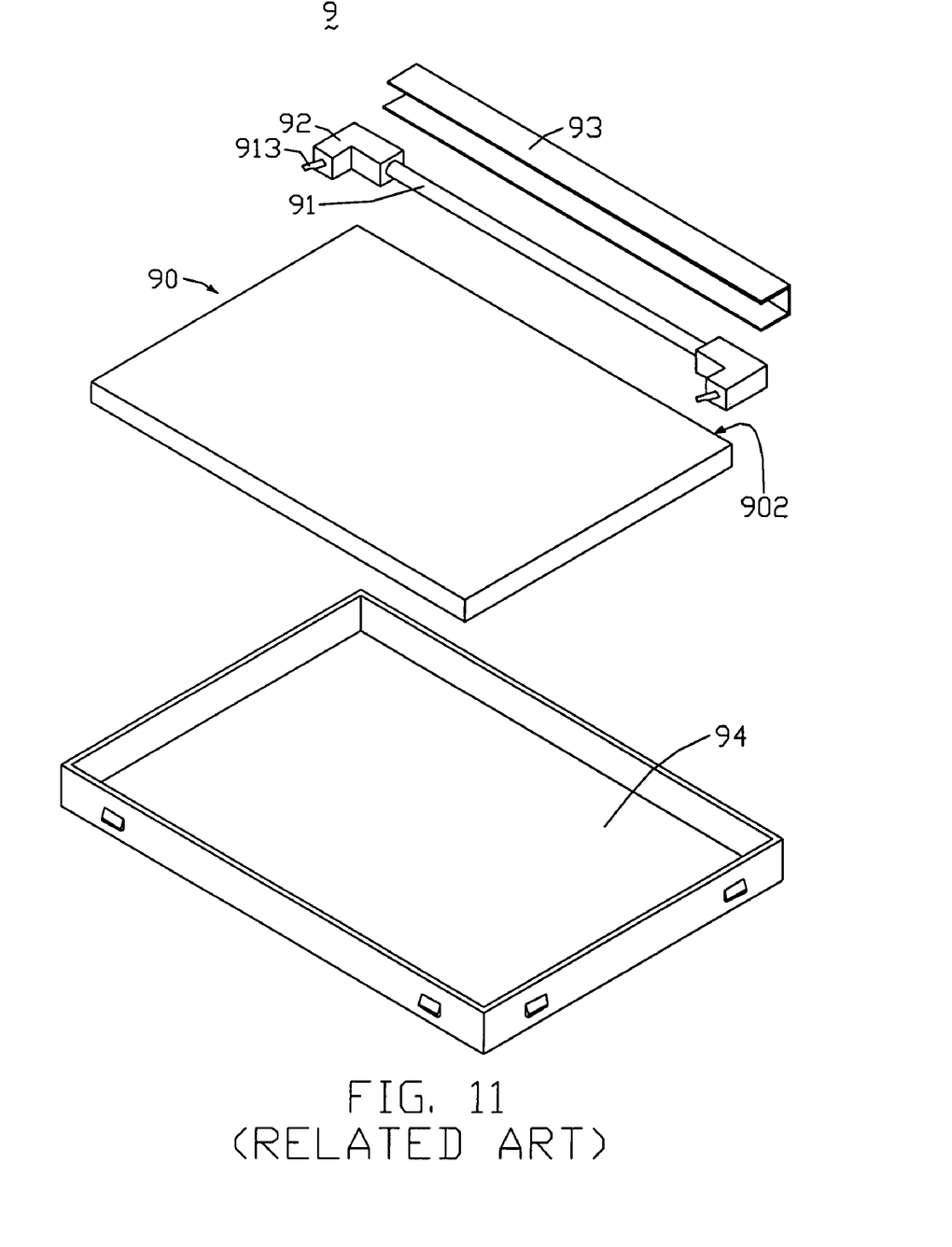
FIG. 11 is an exploded, isometric view of a conventional backlight module, the backlight module including an illuminator and a pair of illuminator holding members.
Figure 12:
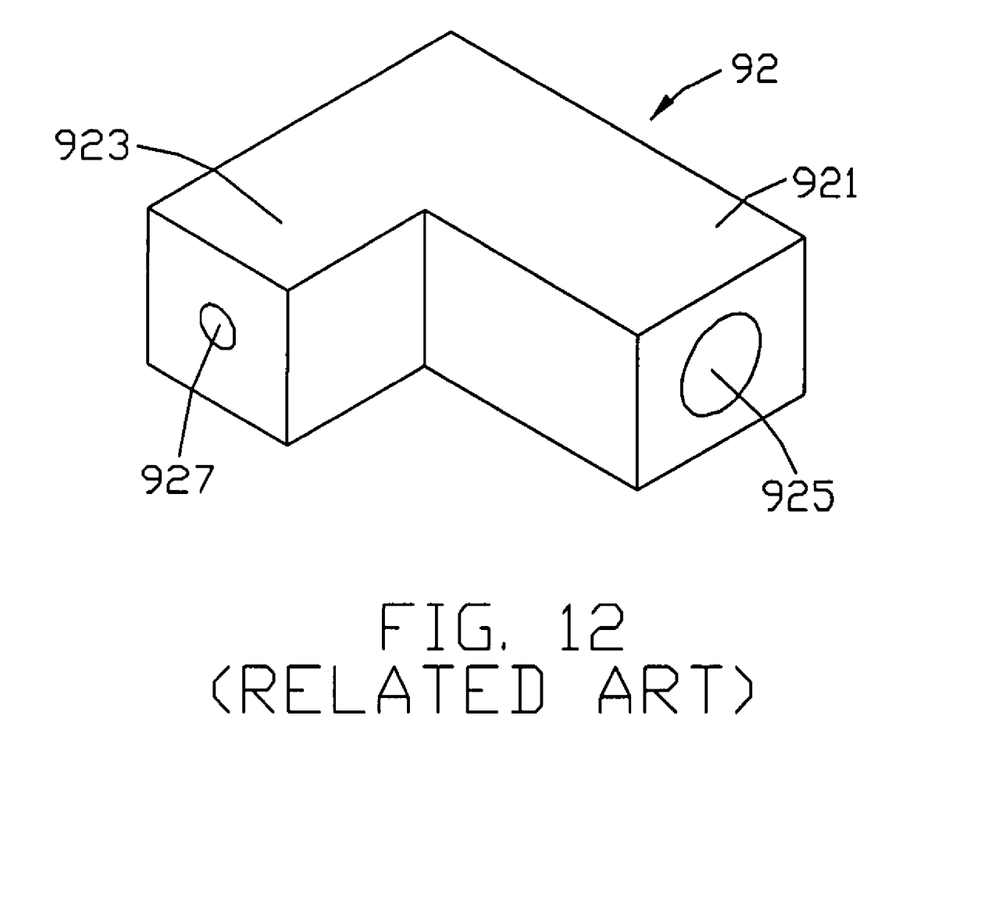
FIG. 12 is an enlarged view of one of the illuminator holding members of FIG. 11.

Referring to FIG. 11, a typical backlight module 9 includes a light guide plate 90, an illuminator 91, a pair of illuminator holding members 92, a reflector 93, and a bottom tray 94 accommodating the light guide plate 90, the illuminator 91, the illuminator holding members 92, and the reflector 93. Referring also to FIG. 12, the illuminator 91 is essentially linear, and has a pair of conductive wires 913 electrically connected with opposite ends (not labeled) thereof respectively.

Each illuminator holding member 92 is substantially L-shaped. The illuminator holding member 92 includes a first arm 921, and a second arm 923 perpendicularly extending from the first arm 921. The first arm 921 includes a holding hole 925 for receiving and holding one of the ends of the illuminator 91. The second arm 923 includes a wire hole 927 for allowing one of the conductive wires 913 to extend therethrough. The wire hole 927 and the holding hole 925 communicate with each other within the illuminator holding member 92.

When the backlight module 9 is assembled, the illuminator 91 and the illuminator holding members 92 coupled to the ends of the illuminator 91 are located adjacent to a light incident surface 902 of the light guide plate 90. Thereby, the illuminator 91 can provide light beams for the backlight module 9.

However, the light guide plate 90 is liable to shift and move toward the illuminator 91 when the backlight module 9 is subjected to vibration or shock during operation or transportation. When this happens and the light guide plate 90 presses on the illuminator holding members 92, the force is liable to be transmitted through the first arms 921 of the illuminator holding members 92 to the ends of the illuminator 91. Thus the ends of the illuminator 91 may be damaged or even broken. When this happens, operation of the backlight module 9 may become faulty, or the backlight module 9 may even fail.

What is needed, therefore, is a backlight module that can overcome the above-described deficiencies. What is also need is a liquid crystal display including the backlight module.

SUMMARY

In an exemplary embodiment, a backlight module includes a light guide plate having a light incident surface, an illuminator adjacent to the light incident surface of the light guide plate, and an illuminator holding member coupled to one end of the illuminator. The illuminator holding member includes a first holding hole receiving the end of the illuminator such that the holding member holds the end of the illuminator, and a first buffering cavity between the first holding hole and the light incident surface of the light guide plate. A liquid crystal display including the backlight module is also provided.

Other novel features, advantages, and aspects will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
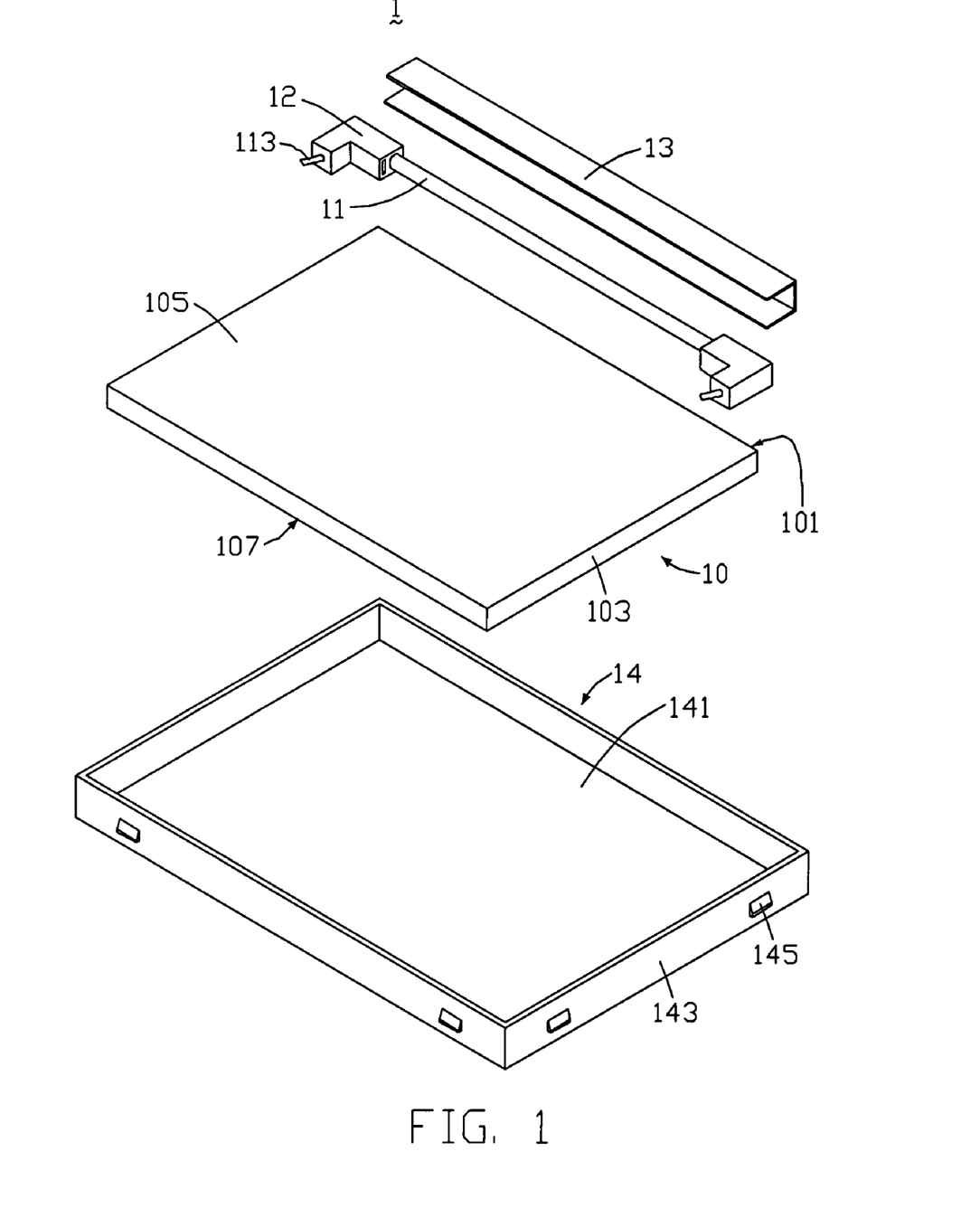
FIG. 1 is an exploded, isometric view of a backlight module according a first embodiment of the present invention, the backlight module including an illuminator and a pair of illuminator holding members.

Referring to FIG. 1, a backlight module 1 according to a first embodiment of the present invention is shown. The backlight module 1 includes a light guide plate 10, an illuminator 11, a pair of illuminator holding members 12, a reflector 13, and a bottom tray 14 accommodating the light guide plate 10, the illuminator 11, the illuminator holding members 12, and the reflector 13.

The light guide plate 10 is substantially rectangular. The light guide plate 10 includes a light incident surface 101, two opposite side surfaces 103 perpendicularly connected to the light incident surface 101, a top light emitting surface 105 perpendicularly connected to the light incident surface 101 and the side surfaces 103, and a bottom surface 107. That is, the light incident surface 101 and the side surfaces 103 are between the light emitting surface 105 and the bottom surface 107. The light guide plate 10 can for example be made from polycarbonate (PC) or polymethyl methacrylate (PMMA), and can be manufactured by an injection molding method.

The illuminator 11 is essentially linear and cylindrical. In the illustrated embodiment, the illuminator 11 is a cold cathode fluorescent lamp (CCFL). The illuminator 11 includes two opposite ends (not labeled), and each end is electrically connected to a respective conductive wire 113.

The reflector 13 has an essentially U-shaped profile, and defines a rectangular opening (not labeled) for allowing light beams emitted from the illuminator 11 to exit therethrough. Inner surfaces (not labeled) of the reflector 13 are provided with a reflective layer (not labeled). The reflective layer can be formed by coating reflective material on the inner surfaces of the reflector 13. In the illustrated embodiment, a horizontal length of the reflector 13 is substantially the same as a length of the light incident surface 101.

Figure 2:
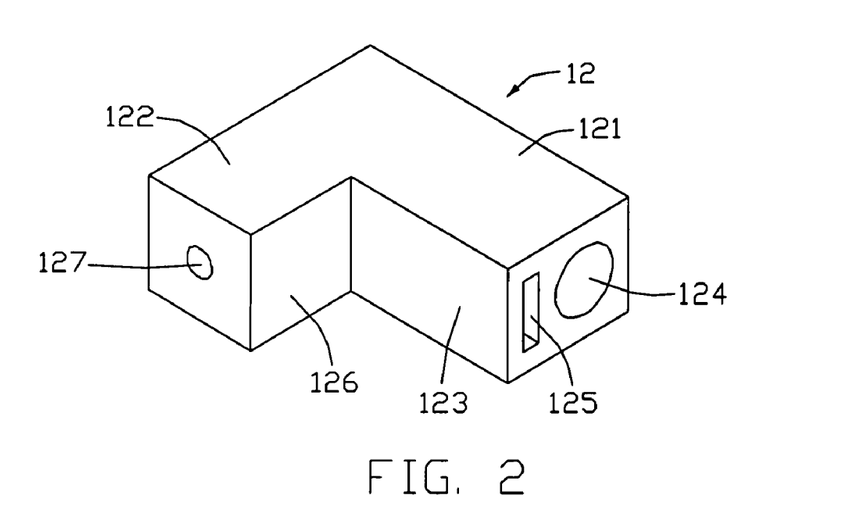
FIG. 2 is an enlarged view of one of the illuminator holding members of FIG. 1.

Referring also to FIG. 2, each illuminator holding member 12 is essentially L-shaped, and includes a first arm 121 and a second arm 122 perpendicularly extending from the first arm 121. The first arm 121 includes a first side surface 123 adjacent to the light incident surface 101 of the light guide plate 10. The first arm 121 further defines a holding hole 124 and a buffering cavity 125 therein. The holding hole 124 is cylindrical, and corresponds to one of the ends of the illuminator 11. A diameter of the holding hole 124 is slightly greater than a diameter of the end of the illuminator 11. The buffering cavity 125 is between the first side surface 123 and the holding hole 124. In the illustrated embodiment, the buffering cavity 125 is substantially rectangular, and opposite inner surfaces (not labeled) of the first arm 121 that partly define the buffering cavity 125 are essentially parallel to the first side surface 123. A height of the buffering cavity 125 is slightly greater than the diameter of the end of the illuminator 11. The second arm 122 includes a second side surface 126 adjacent to the first side surface 123, and defines a wire hole 127 therein. The wire hole 127 and the buffering cavity 124 communicate with each other within the illuminator holding member 12. A central axis of the wire hole 127 and a central axis of the buffering cavity 124 share a common plane that is parallel to top and bottom surfaces (not labeled) of the illuminator holding member 12. The illuminator holding member 12 can for example be made from elastic rubber, such that the buffering cavity 124 is deformable.

The bottom tray 14 includes a bottom plate 141, and four side plates 143 perpendicularly extending up from edges of the bottom plate 141. Thereby, the bottom plate 141 and the side plates 143 cooperatively define a space (not labeled) for accommodating the light guide plate 10, the illuminator 11, the illuminator holding members 12, and the reflector 13. The bottom tray 14 further includes a plurality of protrusions 145 outwardly extending from outer sides of the side plates 143, respectively. The bottom tray 14 can for example be made from iron, aluminum, magnesium, any suitable material that includes an alloy of these, or another suitable material.

Figure 3:
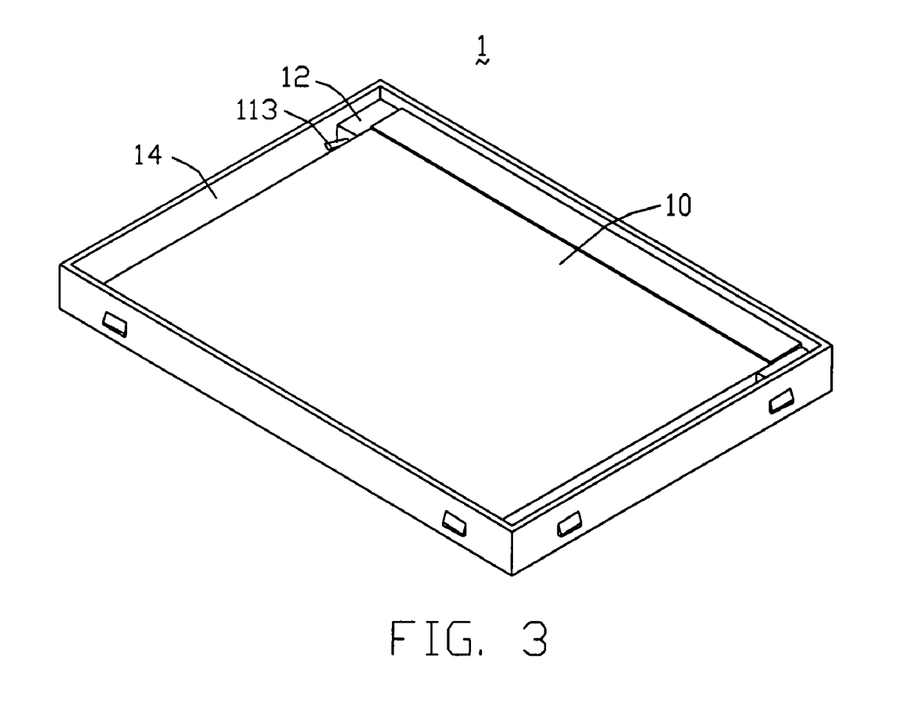
FIG. 3 is an assembled view of the backlight module of FIG. 1.

Referring also to FIG. 3, when the backlight module 1 is assembled, the light guide plate 10, the illuminator 11, the illuminator holding members 12, and the reflector 13 are accommodated in the bottom tray 14. The ends of the illuminator 11 are respectively received in the holding holes 124 of the illuminator holding members 12. The conductive wires 113 respectively extend through the wire holes 127. The illuminator 11 and the first arms 121 are received in the reflector 13. The first side surfaces 123 of the illuminator holding members 12 are adjacent to the light incident surface 101, and the second side surfaces 126 of the illuminator holding members 12 are adjacent to the side surfaces 103 of the light guide plate 10 respectively.

With the above-described configuration, when the backlight module 1 is subjected to vibration or shock during operation or transportation, the illuminator holding members 12 at the buffering cavities 125 can elastically deform and rebound. Thereby, the illuminator holding members 12 can absorb most or all force exerted from the light guide plate 10 that would otherwise act on the ends of the illuminator 11. Thus the ends of the illuminator 11 are protected from being damaged, and the optical performance and reliability of the backlight module 1 are maintained.

Figure 4:
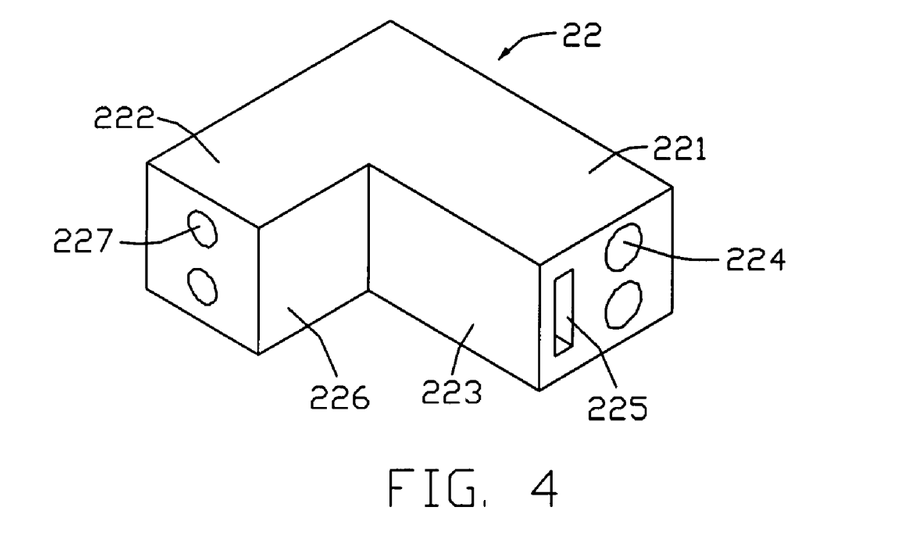
FIG. 4 is similar to FIG. 2, but showing a corresponding view in the case of an illuminator holding member of a backlight module according to a second embodiment of the present invention.

Referring to FIG. 4, a pair of illuminator holding members 22 of a backlight module according to a second embodiment of the present invention are similar to the illuminator holding members 12 of the first embodiment. Each illuminator holding member 22 includes a first arm 221, and a second arm 222 perpendicularly extending from the first arm 221. The first arm 221 defines a pair of holding holes 224 and a buffering cavity 225. Diameters of the holding holes 224 are the same. Central axes of the holding holes 224 maintain the same distance relative to a first side surface 223 of the first arm 221. The buffering cavity 225 is between the holding holes 224 and the first side surface 223. The second arm 222 defines a pair of wire holes 227. Diameters of the wire holes 227 are the same. Central axes of the wire holes 227 maintain the same distance relative to a second side surface 226 of the second arm 222. An upper one of the wires holes 227 communicates with an upper one of the holding holes 224 within the illuminator holding member 22. The lower wire hole 227 communicates with the lower holding hole 224 within the illuminator holding member 22. The illuminator holding members 22 can hold two illuminators (not shown). In other respects, the backlight module has advantages similar to those described above in relation to the backlight module 1.

Figure 5:
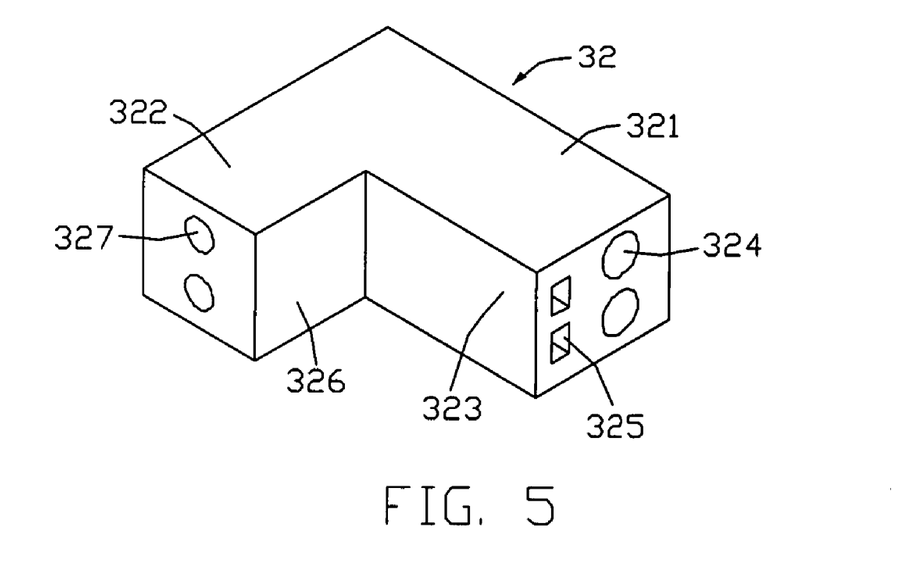
FIG. 5 is similar to FIG. 2, but showing a corresponding view in the case of an illuminator holding member of a backlight module according to a third embodiment of the present invention.

Referring to FIG. 5, a pair of illuminator holding members 32 of a backlight module according to a third embodiment of the present invention are similar to the illuminator holding members 12 of the first embodiment. Each illuminator holding member 32 includes a first arm 321, and a second arm 322 perpendicularly extending from the first arm 321. The first arm 321 defines a pair of holding holes 324 and a pair of buffering cavities 325. Diameters of the holding holes 324 are the same. Central axes of the holding holes 324 maintain the same distance relative to a first side surface 323 of the first arm 321. The buffering cavities 325 are between the holding holes 324 and the first side surface 323, and respectively correspond to the holding holes 324. The second arm 322 defines a pair of wire holes 327. Diameters of the wire holes 327 are the same. Central axes of the wire holes 327 maintain the same distance relative to a second side surface 326 of the second arm 322. An upper one of the wires holes 327 communicates with an upper one of the holding holes 324 within the illuminator holding member 32. The lower wire hole 327 communicates with the lower holding hole 324 within the illuminator holding member 32. The backlight module has advantages similar to those described above in relation to the backlight module 1.

Figure 6:
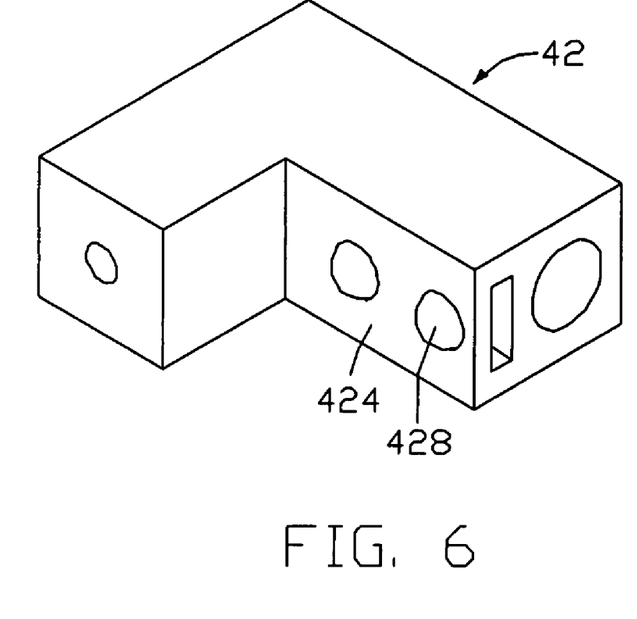
FIG. 6 is similar to FIG. 2, but showing a corresponding view in the case of an illuminator holding member of a backlight module according to a fourth embodiment of the present invention.

Referring to FIG. 6, a pair of illuminator holding members 42 of a backlight module according to a fourth embodiment of the present invention are similar to the illuminator holding members 12 of the first embodiment. However, each illuminator holding member 42 further includes a pair of buffering protrusions 428 formed at a side surface 424 thereof, which side surface 424 is adjacent and essentially parallel to a light incident surface (not shown) of a light guide plate (not shown). The buffering protrusions 428 are aligned along a horizontal axis, and outwardly extend from the side surface 424 toward the light incident surface. In the illustrated embodiment, the buffering protrusions 428 are substantially hemispherical. In alternative embodiments, the buffering protrusions 428 can be arc spherical, semicylindrical, or arc cylindrical. The backlight module has advantages similar to those described above in relation to the backlight module 1.

Figure 7:
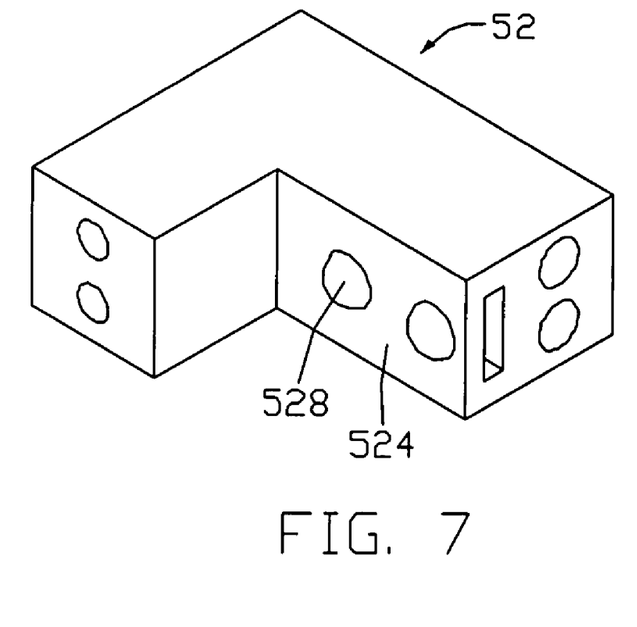
FIG. 7 is similar to FIG. 2, but showing a corresponding view in the case of an illuminator holding member of a backlight module according to a fifth embodiment of the present invention.

Referring to FIG. 7, a pair of illuminator holding members 52 of a backlight module according to a fifth embodiment of the present invention are similar to the illuminator holding members 22 of the second embodiment. However, each illuminator holding member 52 further includes a pair of buffering protrusions 528 formed at a side surface 524 thereof, which side surface 524 is adjacent and essentially parallel to a light incident surface (not shown) of a light guide plate (not shown). The buffering protrusions 528 are aligned along a horizontal axis, and outwardly extend from the side surface 524 toward the light incident surface. In the illustrated embodiment, the buffering protrusions 528 are hemispherical. In alternative embodiments, the buffering protrusion 528 can be arc spherical, semicylindrical, or arc cylindrical. The backlight module has advantages similar to those described above in relation to the backlight module having the illuminator holding members 22.

Figure 8:
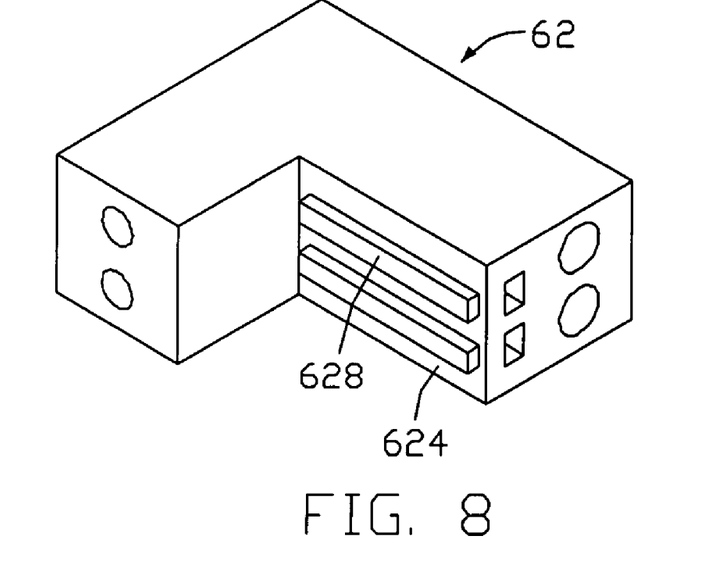
FIG. 8 is similar to FIG. 2, but showing a corresponding view in the case of an illuminator holding member of a backlight module according to a sixth embodiment of the present invention.

Referring to FIG. 8, a pair of illuminator holding members 62 of a backlight module according to a sixth embodiment of the present invention are similar to the illuminator holding members 32 of the third embodiment. However, each illuminator holding member 62 further includes a pair of buffering bars 628 formed at a side surface 624 thereof, which side surface 628 is adjacent and essentially parallel to a light incident surface (not shown) of a light guide plate (not shown). The buffering bars 628 are horizontal, and outwardly extend from the side surface 624 toward the light incident surface. A combined height spanned by both buffering bar 628 is less than a thickness of the light guide plate. The backlight module has advantages similar to those described above in relation to the backlight module having the illuminator holding members 32.

Figure 9:
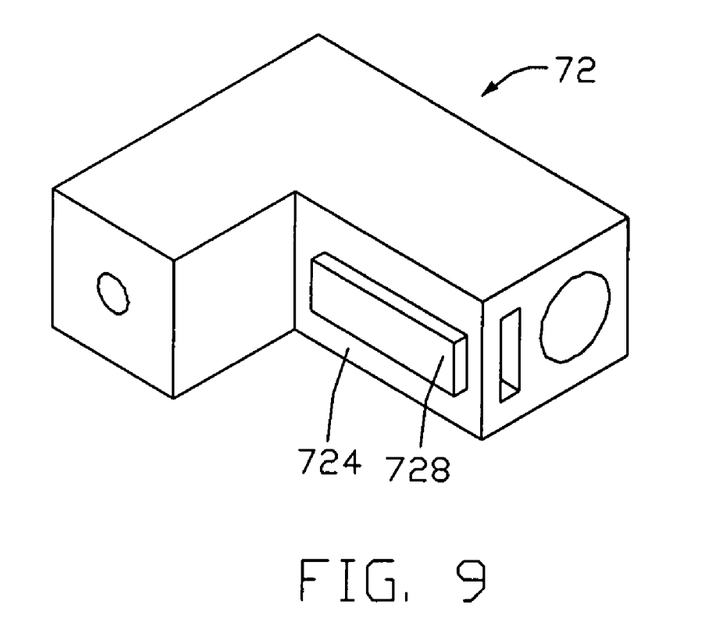
FIG. 9 is similar to FIG. 2, but showing a corresponding view in the case of an illuminator holding member of a backlight module according to a seventh embodiment of the present invention.

Referring to FIG. 9, a pair of illuminator holding members 72 of a backlight module according to a seventh embodiment of the present invention are similar to the illuminator holding members 12 of the first embodiment. However, each illuminator holding member 72 further includes a buffering bar 728 formed at a side surface 724 thereof, which side surface 724 is adjacent and essentially parallel to a light incident surface (not shown) of a light guide plate (not shown). The buffering bar 728 is horizontally oriented, and outwardly extends from the side surface 724 toward the light incident surface. A height of the buffering bar 728 is substantially the same as a thickness of the light guide plate. The backlight module has advantages similar to those described above in relation to the backlight module 1.

Figure 10:
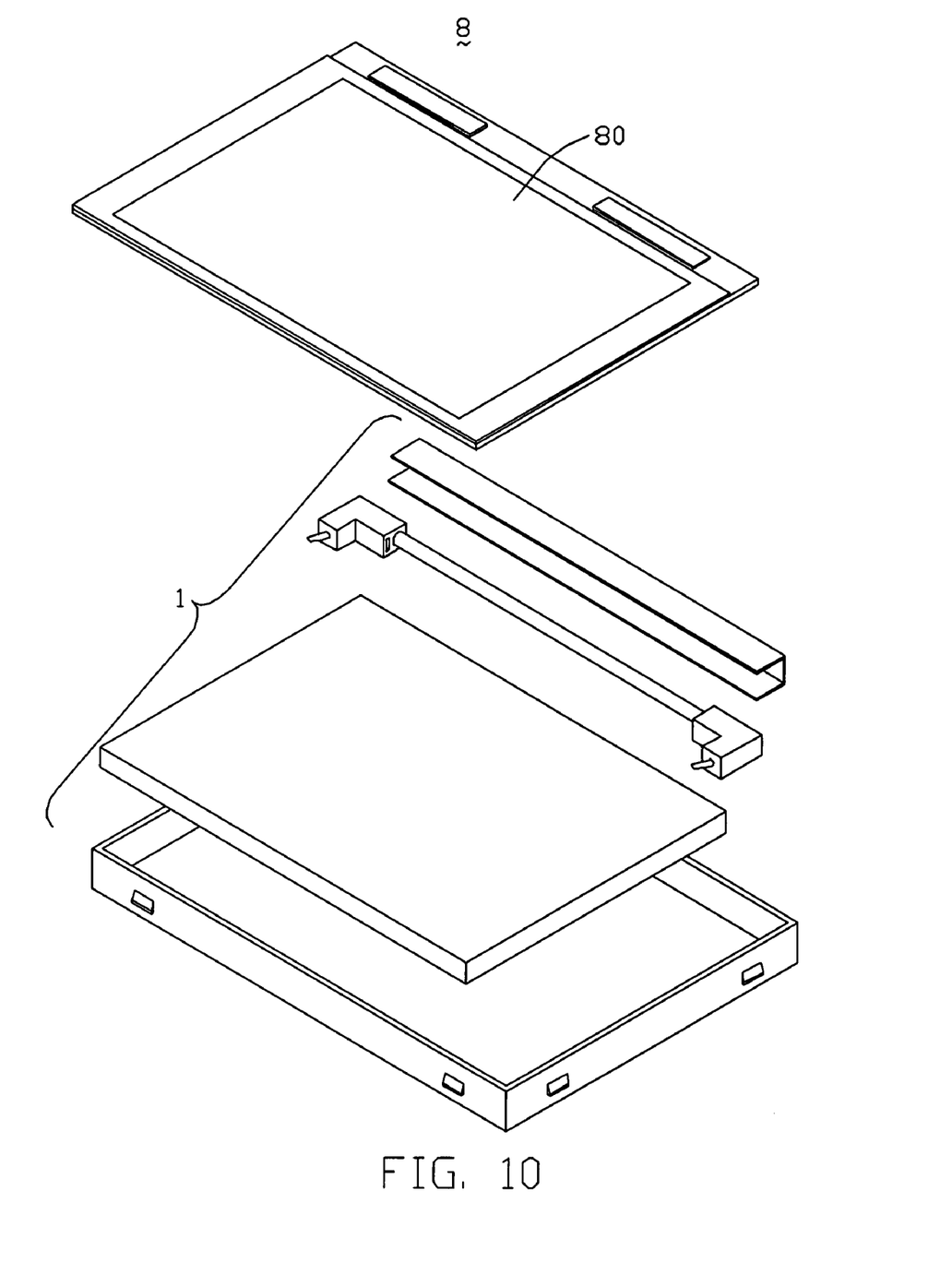
FIG. 10 is an exploded, isometric view of a liquid crystal display according to an exemplary embodiment of the present invention, the liquid crystal display including the backlight module of FIG. 1 and a liquid crystal panel.

In FIG. 10, a liquid crystal display according to an exemplary embodiment of the present invention is shown. The liquid crystal display 8 includes a liquid crystal panel 80, and the backlight module 1 located adjacent to the liquid crystal panel 80. In alternative embodiments, the backlight module 1 can be replaced with any of the other above-described backlight modules.

Further or alternative embodiments may include the following. In a first example, a first arm of each illuminator holding member can define three or more holding holes. In such case, a second arm of the illuminator holding member defines three or more wire holes. Each wire hole communicates with a corresponding one of the holding holes within the illuminator holding member. In a second example, each buffering cavity has a shape defining a transverse cross-section selected from the group consisting of: triangular, circular, cross-shaped, and rhombic. In a third example, where there are two or more buffering cavities, the buffering cavities can have different diameters, and/or can be spaced from the corresponding side surface different distances. In a fourth example, an illuminator can be L-shaped or U-shaped.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A backlight module comprising:
a light guide plate comprising a light incident surface;
an illuminator adjacent to the light incident surface of the light guide plate; and
an illuminator holding member coupled to one end of the illuminator, the illuminator holding member comprising:
a first holding hole receiving the end of the illuminator such that the holding member holds the end of the illuminator, and
a first buffering cavity between the first holding hole and the light incident surface of the light guide plate;
wherein the illuminator holding member comprises a first arm that defines the first holding hole and the first buffering cavity therein.

2. The backlight module as claimed in claim 1, wherein the illuminator holding member further comprises a second arm extending from the first arm.

3. The backlight module as claimed in claim 2, wherein the illuminator holding member is essentially L-shaped.

4. The backlight module as claimed in claim 2, wherein the second arm comprises a first wire hole defined therein.

5. The backlight module as claimed in claim 4, wherein the first wire hole communicates with the first holding hole within the illuminator holding member.

6. The backlight module as claimed in claim 5, wherein the first buffering cavity is essentially rectangular.

7. The backlight module as claimed in claim 6, wherein opposite inner surfaces of the first arm that partly define the first buffering cavity are substantially parallel to the light incident surface of the light guide plate.

8. The backlight module as claimed in claim 1, wherein the first holding hole is substantially cylindrical.

9. The backlight module as claimed in claim 1, wherein the illuminator is essentially linear.

10. The backlight module as claimed in claim 3, wherein the first arm further comprises a second holding hole adjacent to the first holding hole.

11. The backlight module as claimed in claim 10, wherein diameters of the first and second holding holes are the same.

12. The backlight module as claimed in claim 10, wherein central axes of the first and second holding holes maintain the same distance relative to the light incident surface of the light guide plate.

13. The backlight module as claimed in claim 10, wherein the second arm further comprises a second wire hole communicating with the second holding hole within the illuminator holding member.

14. The backlight module as claimed in claim 10, wherein the first arm further comprises a second buffering cavity between the second holding hole and the light incident surface of the light guide plate.

15. The backlight module as claimed in claim 1, wherein the first arm further comprises a buffering protrusion formed at a surface thereof, which protrusion is between the light incident surface and the first buffering cavity.

16. The backlight module as claimed in claim 1, wherein the first arm further comprises a buffering bar formed at a surface thereof, which bar is between the light incident surface and the first buffering cavity.

17. The backlight module as claimed in claim 1, wherein the illuminator holding member is elastically deformable.

18. A liquid crystal display comprising:
a liquid crystal panel; and
a backlight module adjacent to the liquid crystal panel, the backlight module comprising:
  a light guide plate comprising a light incident surface;
  an illuminator adjacent to the light incident surface of the light guide plate; and
an illuminator holding member coupled to one end of the illuminator, the illuminator holding member comprising:
  a first holding hole receiving the end of the illuminator such that the holding member holds the end of the illuminator; and
  a first buffering cavity between the first holding hole and the light incident surface of the light guide plate;
wherein the illuminator holding member comprises a first arm that defines the first holding hole and the first buffering cavity therein.

* * * * *